US007293817B2

(12) United States Patent
Decker et al.

(10) Patent No.: US 7,293,817 B2
(45) Date of Patent: Nov. 13, 2007

(54) GATE REGULATOR

(75) Inventors: Daniel J. Decker, Dorchester, WI (US); Kelly L. Ingersoll, Colby, WI (US)

(73) Assignee: Meyer Manufacturing Corporation, Dorchester, WI (US)

( * ) Notice: Subject to any disclaimer, the term of this patent is extended or adjusted under 35 U.S.C. 154(b) by 0 days.

(21) Appl. No.: 11/352,876

(22) Filed: Feb. 13, 2006

(65) Prior Publication Data

US 2006/0123707 A1 Jun. 15, 2006

Related U.S. Application Data

(62) Division of application No. 10/601,987, filed on Jun. 24, 2003, now Pat. No. 6,996,935.

(51) Int. Cl.
*B62D 33/027* (2006.01)

(52) U.S. Cl. .......................................................... 296/56

(58) Field of Classification Search .................. 296/56, 296/50; 298/17 R, 23 R, 23 A, 23 B, 23 F, 298/23 D, 23 DF
See application file for complete search history.

(56) References Cited

U.S. PATENT DOCUMENTS

| | | | | |
|---|---|---|---|---|
| 3,272,552 | A * | 9/1966 | Park | 296/56 |
| 3,440,763 | A * | 4/1969 | O'Brien | 49/280 |
| 3,721,469 | A * | 3/1973 | Senesac et al. | 298/23 MD |
| 3,860,288 | A | 1/1975 | Martin et al. | |
| 4,109,963 | A | 8/1978 | Sieving et al. | |
| 4,165,897 | A | 8/1979 | Schmidt | |
| 4,334,633 | A | 6/1982 | Piegza | |
| 4,699,428 | A | 10/1987 | Vick | |
| 4,723,817 | A | 2/1988 | Wallan | |
| 4,918,864 | A | 4/1990 | Lunenschloss et al. | |
| 4,989,918 | A | 2/1991 | Biddy | |
| 5,174,632 | A | 12/1992 | Hagenbuch et al. | |
| 5,687,507 | A | 11/1997 | Beran | |
| 5,816,766 | A | 10/1998 | Clark | |
| 5,890,770 | A | 4/1999 | Palmberg, Jr. | |
| 6,115,965 | A | 9/2000 | Jennings | |
| 6,217,123 | B1 | 4/2001 | Palmberg, Jr. | |
| 6,533,342 | B2 | 3/2003 | Auer et al. | |
| 2001/0048240 | A1 | 12/2001 | Palmberg, Jr. | |
| 2004/0261319 | A1 | 12/2004 | Kennedy et al. | |

* cited by examiner

*Primary Examiner*—H. Gutman
(74) *Attorney, Agent, or Firm*—Ryan Kromholz, & Manion, S.C.

(57) ABSTRACT

A gate regulator increases the productivity of unloading agricultural material from forage boxes. The gate regulator enables a box gate to swing open without restriction, but the gate is controlled for slow swinging closed. At a gate release position, the gate regulator releases control of the gate such that it swings freely by gravity from the release position to the closed position. The freely swinging gate has enough momentum to automatically relatch the gate closed. In one embodiment, the gate regulator includes a fluid cylinder with a cylinder pin that is received in an L-shaped slot on the gate. During controlled swinging closed, the cylinder pin is within one of the slots of the L-shaped slot. At the gate release position, the junction of the two slots is at the cylinder pin, which then has room to move freely in the other slot and thereby release the slot from the cylinder pin.

6 Claims, 6 Drawing Sheets

GATE REGULATOR

RELATED APPLICATION

This application is a divisional application of U.S. patent application Ser. No. 10/601,987 filed 24 Jun. 2003 now U.S. Pat. No. 6,996,935.

BACKGROUND OF THE INVENTION

1. Field of the Invention

This invention pertains to swinging doors and gates, and more particularly to apparatus that enables doors and gates to swing freely in one direction but to be controlled when swinging in the other direction.

2. Description of the Prior Art

Modern agricultural equipment includes heavy duty trucks and trailers with large boxes for hauling harvested grain, forage, and other products. An exemplary agricultural box is manufactured by Meyer Manufacturing Corporation of Dorchester, Wis. The box has a floor mounted on the truck or trailer chassis, and front and side walls that upstand from the floor. The back of the box is closeable by a gate that swings about a horizontal axis at the top of the gate. The gate is normally vertical and is latched closed.

To unload the material in the box, apron chains are frequently used. In some boxes, actuating the apron chains automatically unlatches the gate. The apron chains move rearwardly along the box floor and propel the material out the back end of the box. The force of the moving material is sufficient to swing the gate open and propel the material under it. When all the material has been unloaded, the gate swings closed by gravity to its normal closed vertical position.

A problem with prior gates was that, because of their weight, they tended to swing closed before all the material had been discharged from the box. Consequently, the last quantity of material moved only slowly out of the box under the mostly closed gate. The delay in completely unloading the box was detrimental to high farm productivity.

Thus, a need exists for improvements in unloading material from agricultural boxes.

SUMMARY OF THE INVENTION

In accordance with the present invention, a gate regulator is provided that greatly decreases the time required to unload an agricultural forage box. This is accomplished by a unidirectionally restricted fluid cylinder interposed between a box stationary member and the box gate.

The gate regulator comprises a regulator bracket mounted to the box, such as to a side wall, near the gate. The regulator bracket includes a horizontal shaft that receives end plates of the fluid cylinder. The regulator bracket horizontal shaft defines a regulator axis that is parallel to but not concentric with the axis about which the gate swings. According to one aspect of the invention, the regulator axis is higher and rearward of the gate axis. On the cylinder piston rod is a clevis. A cylinder pin passes through the clevis and also through a gate mounting plate that is attached to the gate.

A fluid reservoir is connected to the head and rod ends of the fluid cylinder. In one of the lines between the reservoir and the cylinder is a flow control valve. The flow control valve is set up to enable unrestricted motion of the cylinder piston rod in one direction but to restrict motion of the piston rod in the other direction. Specifically, the flow control valve is set up to enable the gate to freely swing open, but to restrict swinging the gate closed.

The gate is latched closed when loading and transporting the box. At the unloading station, the gate is unlatched. Actuation of apron chains in the box propels material loaded in the box toward the gate. The force of the moving material pushes the gate open. The gate mounting plate and cylinder pin also swing with the gate. Because of the relative locations of the regulator and gate axes, the piston rod is forced into the fluid cylinder as the gate swings open. That action occurs without any restriction on the piston rod, and the box unloads in the normal manner.

When most of the material has been unloaded, the weight of the gate causes it to swing closed. However, the gate regulator flow control valve controls the swinging to a slow speed. The flow control valve can be varied to allow as much time as necessary for the gate to fully close and thereby assure complete and rapid discharge of the entire load.

Further in accordance with the present invention, the gate regulator includes an override trip that removes the restriction of fluid cylinder on the gate as the gate approaches its closed position. The override trip comprises a gate mounting plate having a generally L-shaped slot. A cylinder pin passes through and is free to slide within the L-shaped slot. The override trip further comprises a flexible cable and a trip arm. The trip arm is rotatable on the cylinder pin. The trip arm has first and second beams. One end of the flexible cable is fixed to a member that is stationary relative to the forage box. The cable second end is secured to the trip arm second beam. Preferably, the cable second end is adjustable relative to the trip arm second beam.

When the box gate is closed, the cable is loose, and the cylinder pin is within a first slot of the L-shaped slot in the gate mounting plate. The trip arm is out of contact with the gate mounting plate. As the gate swings open, the cable becomes more slack. Because of the relative locations of the gate and regulator axes, the gate mounting plate pushes the cylinder pin and the piston rod without restriction toward the fluid cylinder. When the gate is at its open position, gravity causes the cylinder pin to drop into a second slot of the L-shaped slot.

When most of the material in the box has been discharged, the gate starts to swing closed due to its weight. When the gate swings closed, the second slot of the L-shaped slot acts on the cylinder pin to pull the piston rod out of the fluid cylinder with restriction. As the gate slowly approaches its closed position, the cable tightens. Continued gate closing causes the cable to rotate the trip arm about the cylinder pin until the trip arm first beam contacts the gate mounting plate. From that point, the closing gate causes the cable to further rotate the trip arm with the first beam acting as a fulcrum on the mounting plate. The rotating trip arm forces the cylinder pin to slide along the second slot toward the first slot. When the gate is at a release position, the cylinder pin has reached the junction of the two slots. At that point, the cylinder pin releases the gate, because the second slot provides room for the cylinder pin to enter and freely move. As a result, the gate is no longer controlled by the fluid cylinder, and the gate freely swings closed by gravity. The override trip is especially useful in forage boxes that automatically re-latch to the apron chains or other components when the gate swings closed, because the momentum of the freely swinging gate is sufficient to enable the latches to re-latch.

In a modified embodiment, the override trip is in the form of a trip lever and a stop arm on a cylinder pin. The cylinder pin is free to both rotate within and slide along an L-shaped slot in the gate mounting plate. Gravity biases the override trip such that a distal end of the trip lever contacts the box when the gate is closed.

When the gate opens under the force of the moving material, a first slot of the L-shaped slot pushes the cylinder pin and thus the piston rod without restriction into the fluid cylinder. As the gate swings further open, the trip lever distal end slides down the box, simultaneously rotating by gravity along with the cylinder pin and stop arm. Ultimately, the trip lever loses contact with the box. The stop arm cooperates with the gate mounting plate opening to limit the amount of rotation of the override trip.

Swinging of the gate toward its closed position causes the gate mounting plate to pull the cylinder pin in a direction away from the fluid cylinder. That action causes the piston rod to extend from the cylinder, but the extension is resisted by the flow control valve. Accordingly, the gate swings closed in a slow and controlled fashion.

As the gate slowly approaches its closed position, the trip lever distal end re-contacts the box. Continued slow closing of the gate causes the trip lever distal end to slide up the box and simultaneously rotate with the cylinder pin and stop arm. The stop arm ultimately strikes the gate mounting plate opening and thereby prevents further rotation of the trip lever. The simultaneous contact of the stop arm with the gate mounting plate and the trip lever with the box holds the cylinder pin stationary relative to the box. However, the weight of the gate continues to swing the gate closed. That action causes the first slot of the L-shaped slot to slide over the stationary cylinder pin until the gate is at a release position, which occurs when the junction of the L-shaped slot is at the cylinder pin. At that point, the first slot is no longer restrained by the cylinder pin. Instead, the second slot releases the gate from the cylinder pin. As a result, the gate is no longer controlled by the fluid cylinder, and the gate freely swings closed by gravity.

The method and apparatus of the invention, using a unidirectionally controlled fluid cylinder and an override trip, thus enables a forage box gate to open easily to discharge a load and to automatically relatch upon closing. The probability of material remaining in the box after the gate has closed is remote, even though the final swinging closed is not controlled.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
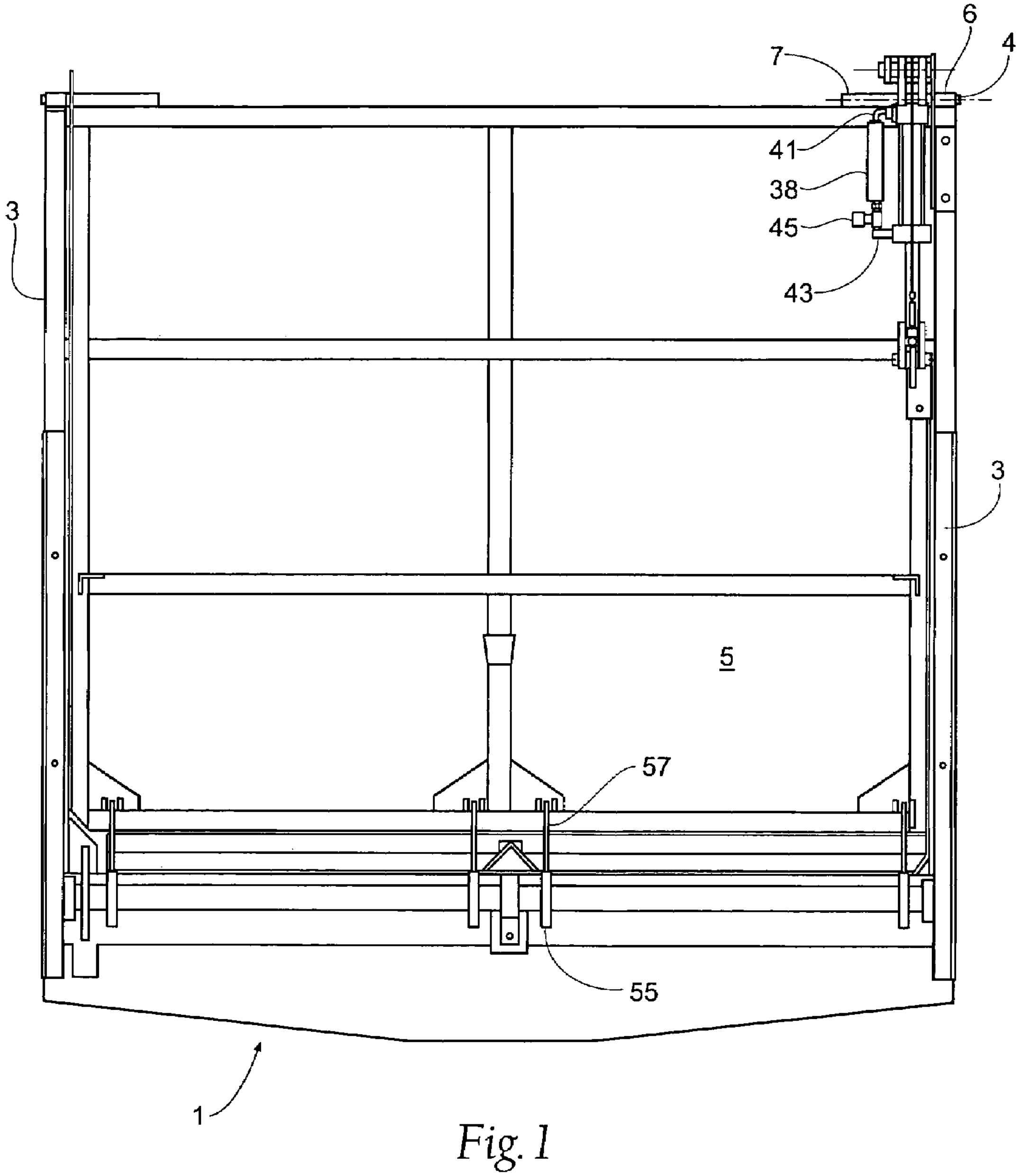
FIG. 1 is a back view of a typical forage box that includes the present invention.

Referring to FIG. 1, the back end of an agricultural forage box 1 is illustrated that includes the present invention. The forage box 1 may be mounted on a truck or trailer chassis, not shown, for hauling grain, forage, and other harvested crops from a field to a storage location. However, it will be understood that the invention is not limited to agricultural applications.

The forage box 1 has two side walls 3 and a heavy gate 5. The gate 5 includes short shafts 4 that are supported in associated journals 6 at the tops of the side walls 3. The journals 6 define a horizontal gate axis 7. The gate swings about the the gate axis 7 between opened and closed positions.

The particular forage box 1 shown further includes a pair of apron chains 55 that travel along the box floor in well-known fashion. Latches 57 on the gate 5 coact with the apron chains 55 to latch the gate in its closed position. Starting the aprons chains 55 to move automatically unlatches the latches 57, thereby enabling the gate to swing open. It will be appreciated, of course, that different means than the latches 57 can be used with the gate and forage box to keep the gate closed without departing from the broad scope of the present invention. For example, the latches may coact with a cog system that is fixed to a drive shaft for the apron chains.

Figure 2:
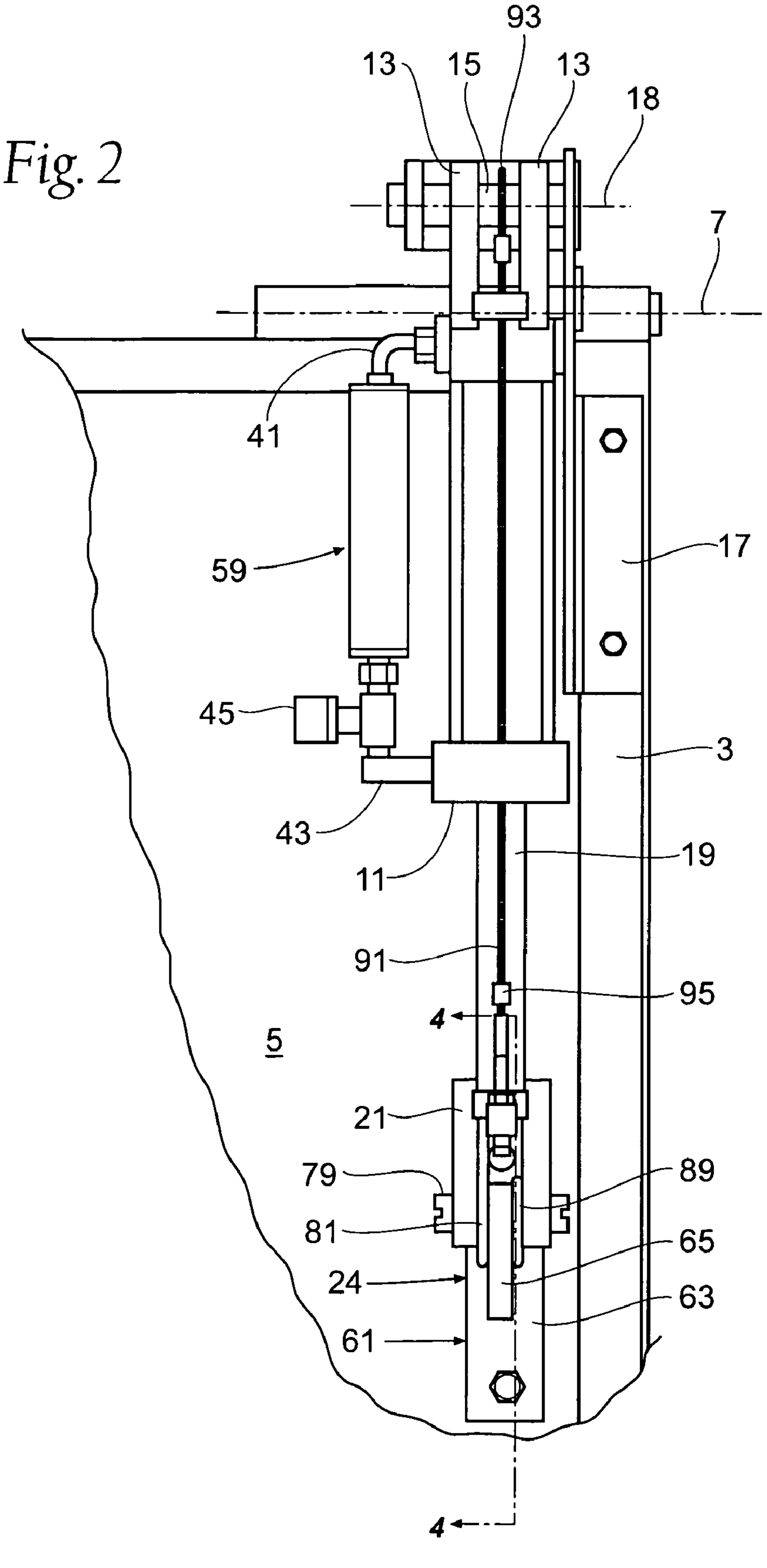
FIG. 2 is an enlarged partial view of FIG. 1.

In accordance with the present invention, and also looking at FIG. 2, a gate regulator 59 controls the swinging of the gate 5. The gate regulator 59 comprises a hydraulic cylinder 11 having clevis plates 13 at the head end. The clevis plates 13 are free to pivot about a pin 15 that is held in a sturdy regulator bracket 17 mounted to one of the box walls 3. The pin 15 defines a regulator axis 18 that is not concentric with the gate axis 7. In the preferred embodiment, the regulator axis 18 is at a higher elevation and is rearwardly of the gate axis. The piston rod 19 of the cylinder 11 has a clevis plate 21 with a cylinder pin 79. The cylinder pin 79 is part of an override trip 24.

The override trip 24 comprises a gate mounting plate 61 having a base 63 that is fastened to the gate 5. A lug 65 on the mounting plate base 63 has a generally L-shaped slot 67. Also see FIGS. 3 and 4. The L-shaped slot 67 has a first slot 71 with a closed end 73, a second slot 75 with a closed end 76, and a junction 77 between the first and second slots. The cylinder pin 79 passes through the mounting plate L-shaped slot. When the gate 5 is closed, the cylinder pin 79 is proximate the closed end 76 of the second slot 75 of the L-shaped slot 67. The distance between the gate axis 7 and the L-shaped slot is less than the distance between the regulator axis 18 and the L-shaped slot. The L-shaped slot travels generally along an arc 42 as the gate swings open and closed.

Rotatable on the cylinder pin 79 is a trip arm 81. The trip arm 81 has a first beam 83 with a lobe 85 on the free end thereof. The trip arm also has a second beam 87. Preferably, there is a spacer 89 on the cylinder pin on the opposite side of the mounting plate lug 65 as the trip arm, FIG. 2.

The gate regulator 59 further comprises a flexible cable 91. One end 93 of the cable 91 is fixed to a member that is stationary relative to the box 1. As illustrated, the cable end 93 is looped around the regulator bracket pin 15. The second end 95 of the cable is connected to the second beam 87 of the trip arm 81, FIG. 4. In the particular construction illustrated, the connection 90 between the cable second end 95 and the trip arm second beam is composed of a short sleeve 99 welded to the trip arm and an eye-bolt 101 on the cable. The eye-bolt shank 103 is inserted through the sleeve 99 and held in place by nuts 105. The nuts 105 are adjustable on the eye-bolt 101 and thus permit adjustment of the distance between the pin 15 and the trip arm second beam. The connection 90 is adjusted such that the cable 91 is slightly loose when the gate 5 is closed and the cylinder pin 79 is proximate the closed end 76 of the second slot 75 of the L-shaped slot 67.

Figure 9:
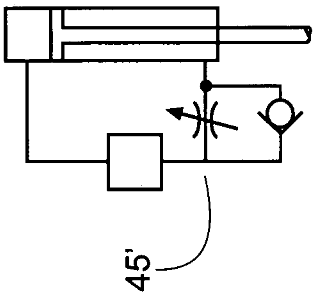
FIG. 9 is a schematic view of the fluid system of the present invention.
Figure 14:
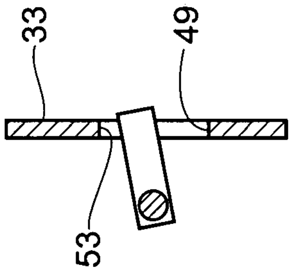
FIG. 14 is a cross-sectional view taken along line 14-14 of FIG. 10.
Figure 13:
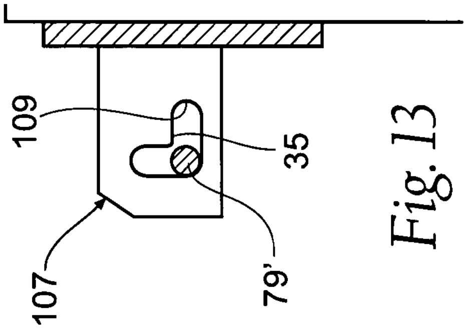
FIG. 13 is a a view similar to FIG. 12, but showing the gate swinging freely near its closed position.
Figure 12:
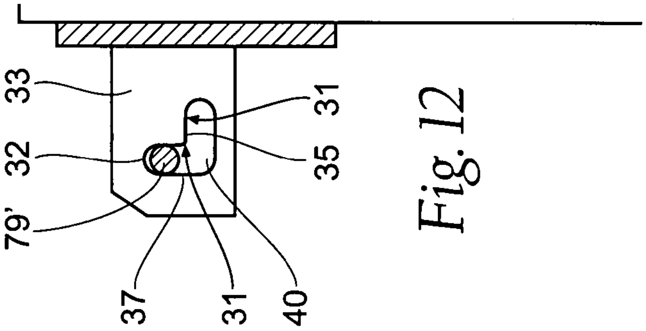
FIG. 12 is a cross-sectional view on an enlarged scale taken along line 12-12 of FIG. 10 when the gate is at its closed position.
Figures 10, 11:
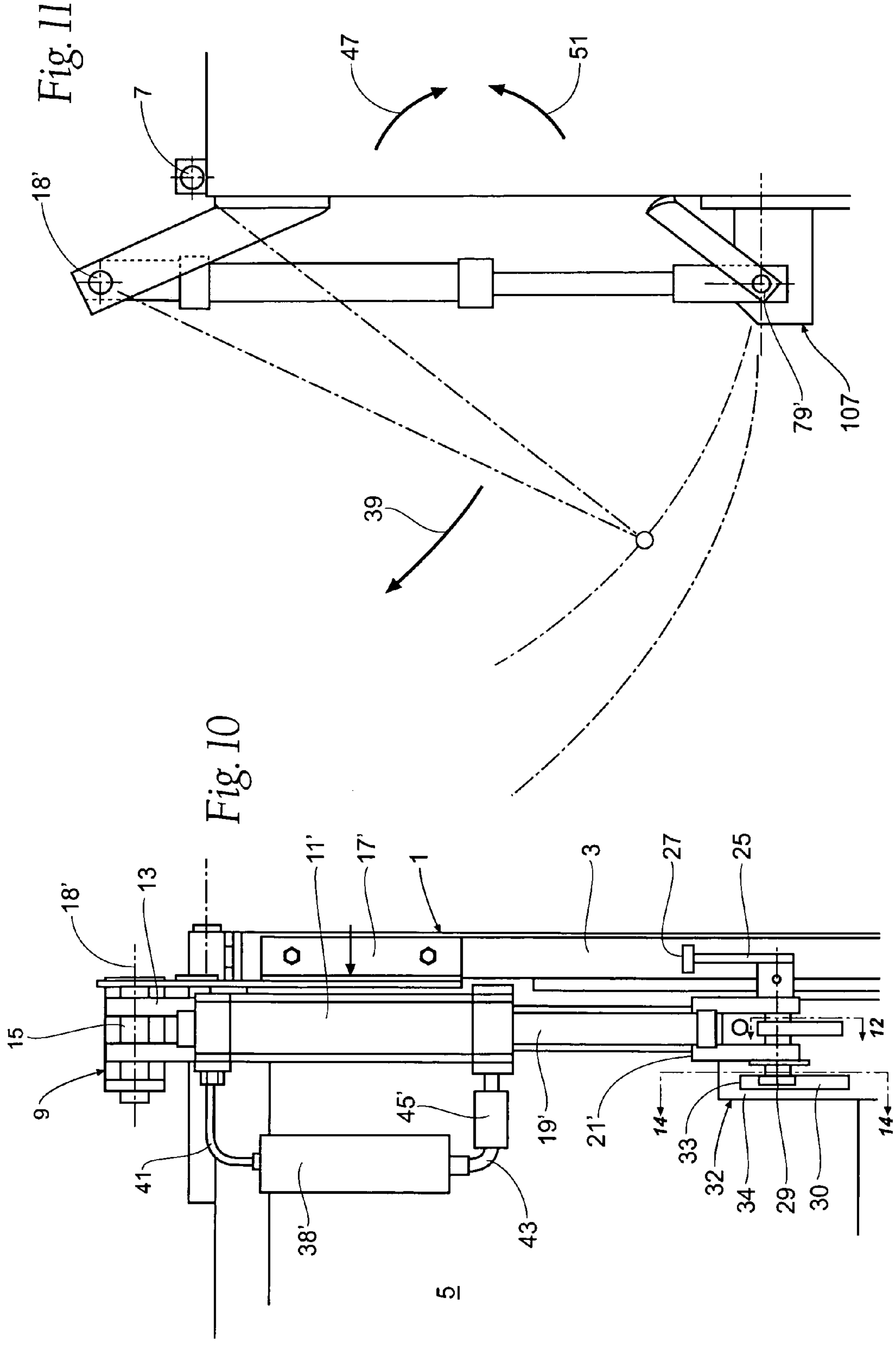
FIG. 10 is a view generally similar to FIG. 2, but showing a modified embodiment of the invention.
FIG. 11 is a side view of FIG. 10.

The head end and rod end of the hydraulic cylinder 11 are connected to a hydraulic reservoir 38 by respective lines 41 and 43, FIGS. 1 and 2. In one of the lines 41 or 43 is a flow control valve 45. Also see FIG. 9. The function of the flow control valve 45 is to enable the piston rod 19 to freely retract into the cylinder, but to restrict the extension of the piston rod from the cylinder.

Figure 5:
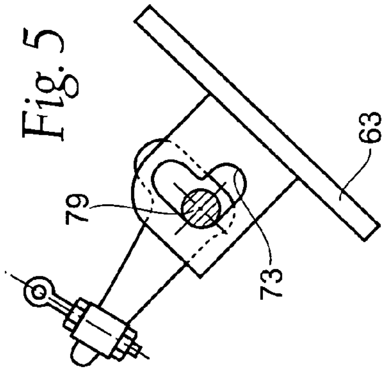
FIG. 5 is view similar to FIG. 4, but showing the gate after it has swung to a partially open position.

In operation, the gate 5 is latched while the forage box 1 is being loaded, and while the truck is driven to the unloading site. When ready to unload the forage box, the gate is unlatched. If the forage box has the latches 57, operating the apron chains 55 automatically unlatches the latches. Crop material, not shown, in the box 1 is propelled by the apron chains against the gate. That action forces the gate to swing about the gate axis 7 in the direction of arrow 39, FIG. 3. The gate regulator 59 permits free swinging of the gate 5 in the direction of arrow 39 but controls swinging of the gate in the direction of arrow 51. Specifically, because of the relative locations of the gate axis 7 and regulator axis 18, initial swinging of the gate causes the second slot 75 of the L-shaped slot 67 to slide over the cylinder pin 79 until the junction 77 contacts the cylinder pin, FIG. 5. Further swinging of the gate causes the L-shaped slot junction to push the cylinder pin, and thus the piston rod 19, into the hydraulic cylinder 11 without restriction.

Figure 3:
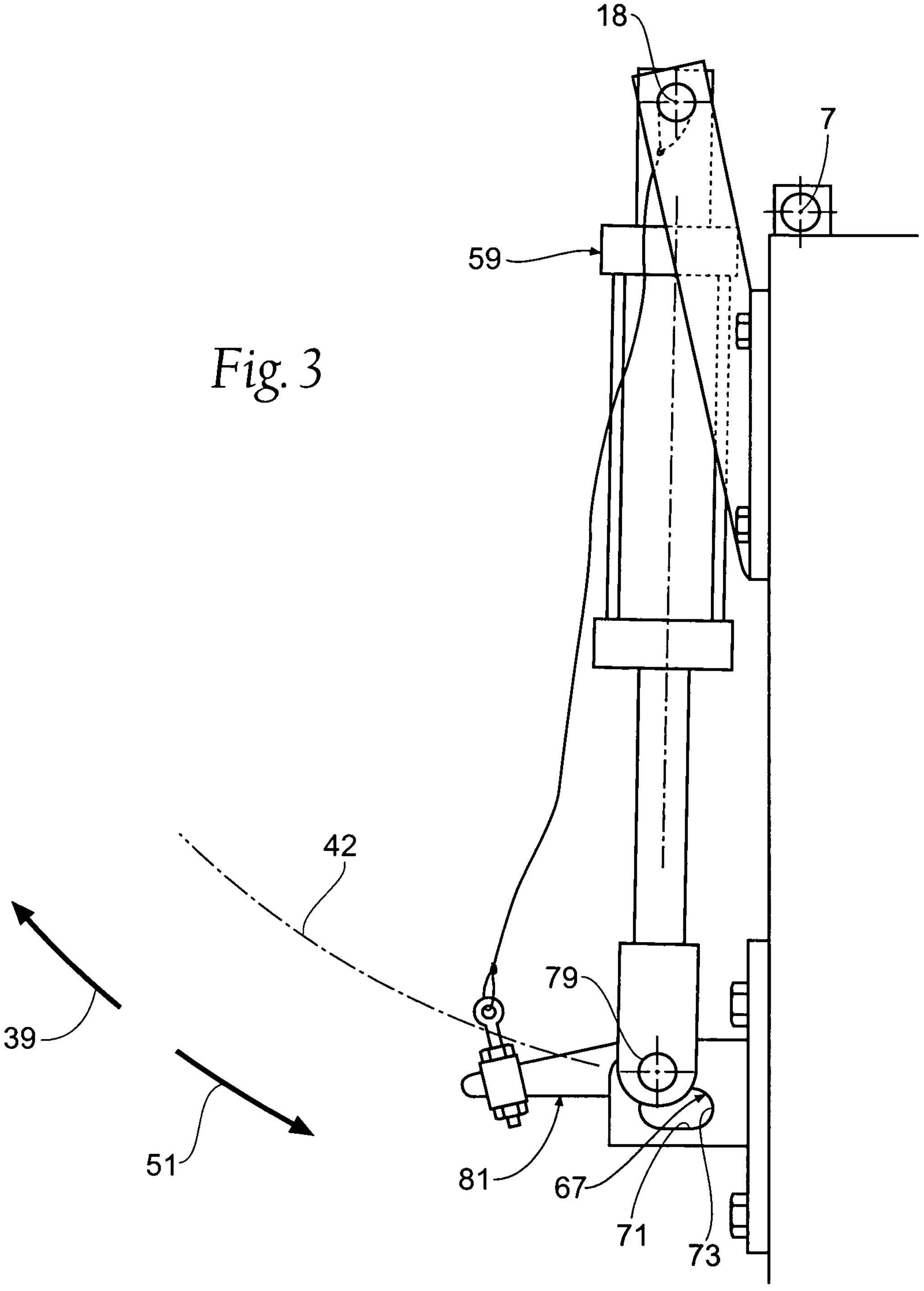
FIG. 3 is side view of FIG. 2.
Figure 4:
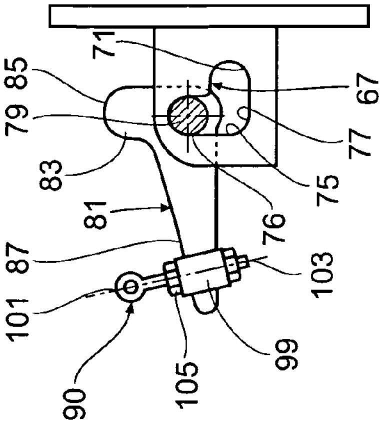
FIG. 4 is a cross-sectional view on an enlarged scale taken along line 4-4 of FIG. 2 when the gate is at its closed position.
Figure 6:
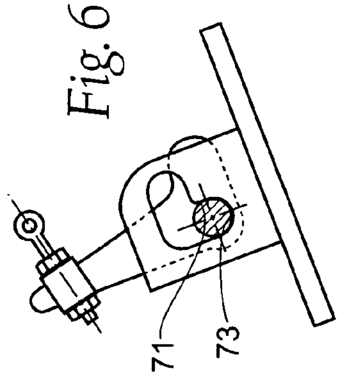
FIG. 6 is view similar to FIG. 4, but showing the gate after it has swung to a fully open position.

After most of the material in the box 1 has been emptied, the gate 5 starts to swing back toward its closed position, arrow 51, FIG. 3. At the start of the closure swing, the force of the L-shaped slot 67 on the cylinder pin 79 is removed, and gravity causes the hydraulic cylinder and piston rod to rotate slightly about the regulator axis 18 such that the cylinder pin falls against the closed end 73 of the L-shaped slot first slot 71, FIG. 6. At that point, the cable 91 is slack.

Figure 7:
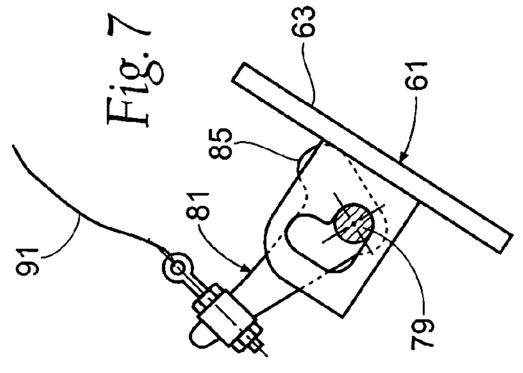
FIG. 7 is view similar to FIG. 4, but showing the gate after it has swung to a partial closed position.

As the gate 5 swings closed by its weight, the first slot 71 of the L-shaped slot 67 pulls the cylinder pin 79, and thus the piston rod 19, out of the hydraulic cylinder 11. Such pulling is resisted by the flow control valve 45 such that the gate swings slowly and under control. As the gate approaches its closed position, the cable 91 gradually tightens. When the cable is tight, further gate swinging causes the cable to rotate the trip arm 81 on the cylinder pin such that the lobe 85 contacts the base 63 of the mounting plate 61, FIG. 7.

Figure 8:
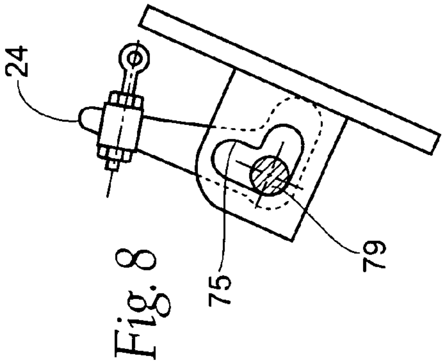
FIG. 8 is view similar to FIG. 4, but showing the gate after it has swung to a release position.

Further closing of the gate 5 causes the trip arm lobe 85 to act as a fulcrum on the mounting plate base 63. The trip arm rotates about the lobe and forces the cylinder pin 79 to slide in the first slot 71 of the L-shaped slot 67 until, the cylinder pin is at the junction 77, FIG. 8. At that point, the gate is at a release position, and the L-shaped slot is no longer restrained by the cylinder pin. The first slot 71 is thus released from the cylinder pin, the second slot 75 is free to slide over the cylinder pin, and the gate swings freely closed. Gravity imparts enough momentum to the gate to enable automatic re-latching of the latches 57. At that point, the override trip 24 has returned to the configuration of FIG. 4. The eyebolt 101 and nuts 105 provide adjustment to the release position of the gate to assure that the gate has sufficient momentum to re-latch the latches.

FIGS. 10-14 show a modified gate regulator 9 according to the present invention. The gate regulator 9 is comprised of a regulator bracket 17' that defines a regulator axis 18', a hydraulic cylinder 11' with a piston rod 19' and clevis plate 21', and a reservoir 38' with a flow control valve 45'. The gate regulator 9 further comprises a gate mounting plate 32 having a base 34 that is attached to the gate 5. The gate mounting plate base 34 defines an opening 30 that may be a generally vertical slot. Perpendicular to the mounting plate base is a lug 33. See FIGS. 12 and 13. In the lug 33 is an L-shaped slot 31. The L-shaped slot 31 has a first slot 35 and a second slot 37 that meet at a junction 40. A cylinder pin 79' on the clevis 21' is received in the L-shaped slot 31. The cylinder pin 79' is free to rotate in the clevis 21'.

The gate regulator 9 further comprises an override trip 107. The override trip 107 includes a trip lever 25 having one end fixed to the cylinder pin 79' and a distal end with a pad 27. On the other end of the cylinder pin is a stop arm 29. The trip lever 25 and stop arm 29 are preferably on opposite sides of the mounting plate lug 33. When the gate 5 is closed, the cylinder pin is near the closed end 109 of the first slot 35, FIG. 12, and the trip lever pad 27 rests against the box wall 3.

Because of the relative locations of the gate axis 7 and the regulator axis 18', the piston rod 19' is pushed into the hydraulic cylinder 11' without resistance as the gate 5 swings open. The cylinder pin 79' remains at the closed end 109 of the slot 35 of the L-shaped slot 31 when the gate is opening. As the gate opens, the trip lever pad 27 slides downwardly along the box wall 3 and simultaneously rotates by gravity in the direction of arrow 47. Eventually, the trip lever pad loses contact with the box wall. The stop arm 29 rotates with the trip lever to strike an edge 49 of the opening 30 in the gate mounting plate base 34 and limit the rotation of the trip lever.

After the material has been unloaded from the box 1, the weight of the gate 5 tends to close it. The flow control valve 45' resists the extension of the piston rod 19' from the hydraulic cylinder 11', thereby slowing the descent of the gate. Eventually, the trip lever pad 27 re-contacts the box wall 3. The trip lever pad slides up the box wall, simultaneously rotating the trip lever 25 and stop arm 29 in the direction of arrow 51. When the stop arm strikes the edge 53 of the gate mounting plate opening 30, no further rotation of the trip lever relative to the gate is possible as the gate closes further. See FIG. 14. The trip lever and stop arm then cooperate to hold the cylinder pin 79' stationary despite further swinging of the gate. Further closure of the gate therefore causes the slot 35 to slide over the cylinder pin until the junction 40 of the two slots 35 and 37 is at the cylinder pin. At that point, the slot 35 is released from the cylinder pin, and the gate is no longer controlled by the cylinder pin or the cylinder. The gate is then able to freely swing back to its closed vertical position with enough momentum to automatically re-latch the latches 57.

In summary, the results and advantages of agricultural forage boxes can now be more fully realized. The gate regulator of the invention provides both slow controlled swinging of the gate for most of its closing, as well as free swinging for the final few degrees of closing. This desireable result comes from using the combined functions of the flow control valve and the override trip. The L-shaped slot in the gate mounting plate pushes the piston rod without restriction into the hydraulic cylinder when the gate swings open, and pulls the piston rod with control when the gate swings closed. The override trip disengages the L-shaped slot from the cylinder pin as the gate approaches its closed position. The momentum of the freely swinging gate is sufficient to automatically relatch the gate to the box.

It will also be recognized that in addition to the superior performance of the invention, its construction is such as to be of modest cost in relation to the benefits it provides. In fact, the gate regulator quickly pays for itself due to increased productivity when unloading agricultural materials from forage boxes.

Thus, it is apparent that there has been provided, in accordance with the invention, a gate regulator that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method of controlling the swinging of a gate in a box comprising the steps of:
- a. swinging the gate without restriction from a closed position to an open position;
- b. controlling the gate to swing with slow control from the open position to a release position; and
- c. swinging the gate freely from the release position to the closed positions;
- d. adjusting the gate release position.

2. The method of claim 1 wherein:
- a. the method further comprising the step of providing a gate with an L-shaped slot thereon having first and second slots that meet at a junction; and
- b. the step of controlling the gate comprises the steps of:
  - i. providing a fluid cylinder having a cylinder pin;
  - ii. receiving the cylinder pin in a selected one of the first and second slots of the L-shaped slot when the gate swings from the open position toward the closed position; and
  - iii. releasing the selected slot of the L-shaped slot from the cylinder pin when the gate is at the release position thereof.

3. The method of claim 2 wherein the step of releasing the selected slot comprises the steps of:
- a. providing a trip arm on the cylinder pin;
- b. rotating the trip arm on the cylinder pin and simultaneously sliding the cylinder pin along the selected slot to the junction of the L-shaped slot.

4. The method of claim 3 wherein the step of rotating the trip arm comprises the steps of:
- a. connecting a flexible cable between the trip arm and a selected member that is stationary relative to the box; and
- b. tightening the cable as the gate swings from the open position to the release position and rotating the trip arm with the tight cable as the gate approaches the release position.

5. The method of claim 4 comprising the further step of adjusting the cable on the trip arm and thereby adjusting the gate release position relative to the closed position.

6. The method of claim 4 wherein the step of releasing the selected slot comprises the steps of:
- a. providing a trip lever and a stop arm on the cylinder pin;
- b. contacting the trip lever with the box, and contacting the stop arm with the mounting plate; and
- c. holding the cylinder pin stationary relative to the box, and sliding the selected slot over the cylinder pin until the junction of the L-shaped slot is at the cylinder pin and thereby releases the selected slot from the cylinder pin.

* * * * *